(12) United States Patent
Maher

(10) Patent No.: US 7,748,511 B1
(45) Date of Patent: Jul. 6, 2010

(54) VENDING SYSTEM FOR WHEELED VEHICLES

(75) Inventor: Jay A. Maher, Barrington, IL (US)

(73) Assignee: Nelson Whittaker, Crystal Lake, IL (US)

( * ) Notice: Subject to any disclaimer, the term of this patent is extended or adjusted under 35 U.S.C. 154(b) by 1039 days.

(21) Appl. No.: 11/089,972

(22) Filed: Mar. 25, 2005

(51) Int. Cl.
G07F 7/00 (2006.01)
(52) U.S. Cl. ...................................... 194/205
(58) Field of Classification Search ............... 194/905, 194/205, 350
See application file for complete search history.

(56) References Cited

U.S. PATENT DOCUMENTS

| 3,978,959 | A | | 9/1976 | Muellner |
| 4,450,968 | A | | 5/1984 | Muellner |
| 4,518,073 | A | | 5/1985 | Pastien |
| 5,655,595 | A | * | 8/1997 | Westbrooks, Jr. .......... 165/48.1 |
| 5,844,873 | A | * | 12/1998 | Aoyama et al. ............. 720/676 |
| 5,917,407 | A | | 6/1999 | Squire |
| 6,085,887 | A | | 7/2000 | Bohringer |
| 6,142,283 | A | | 11/2000 | Amdahl |
| 6,371,230 | B1 | * | 4/2002 | Ciarla et al. ............... 180/68.5 |
| 7,434,674 | B1 | * | 10/2008 | Bain .......................... 194/205 |

\* cited by examiner

*Primary Examiner*—Jeffrey A Shapiro
(74) *Attorney, Agent, or Firm*—Barnes & Thornburg LLP

(57) ABSTRACT

A system for vending wheeled vehicles, such as strollers for children. The system includes a vehicle station having a series of docking ports with an operator's console connected thereto. Each docking port has a lock and release mechanism for engaging a striker pin of a wheeled vehicle engaged in the docking port. Upon appropriate signals from the operator's console, a vehicle discharge element in the docking port moves the wheeled vehicle when the lock and release mechanism is activated to disengage the striker pin, moving the wheeled vehicle from the locked position and making the availability of the wheeled vehicle obvious.

13 Claims, 6 Drawing Sheets

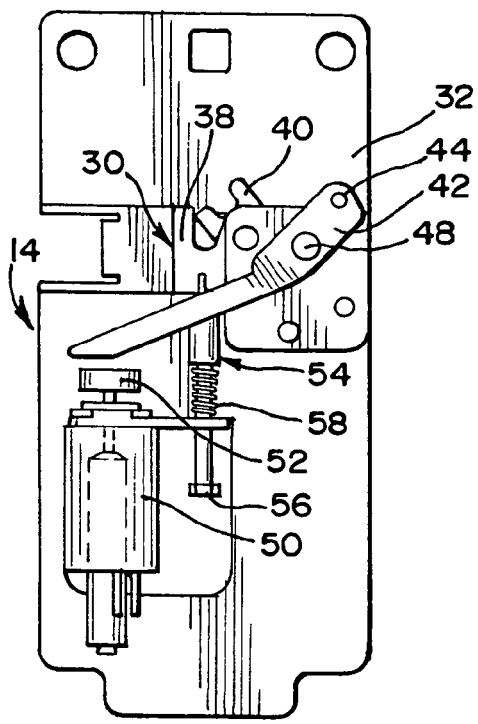
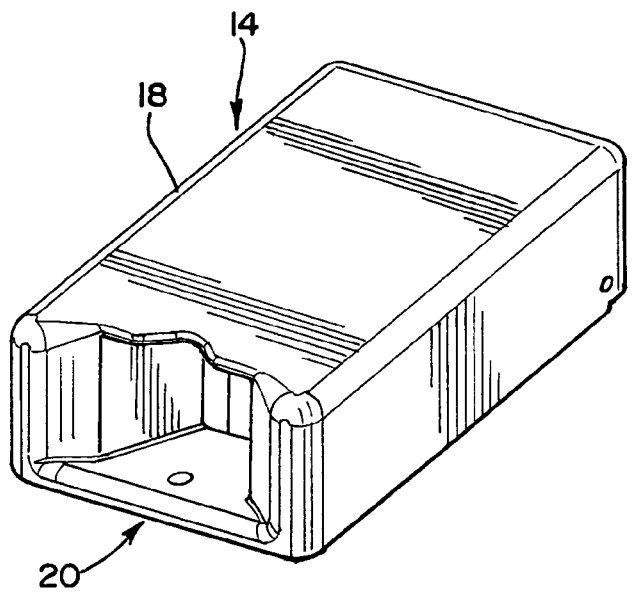
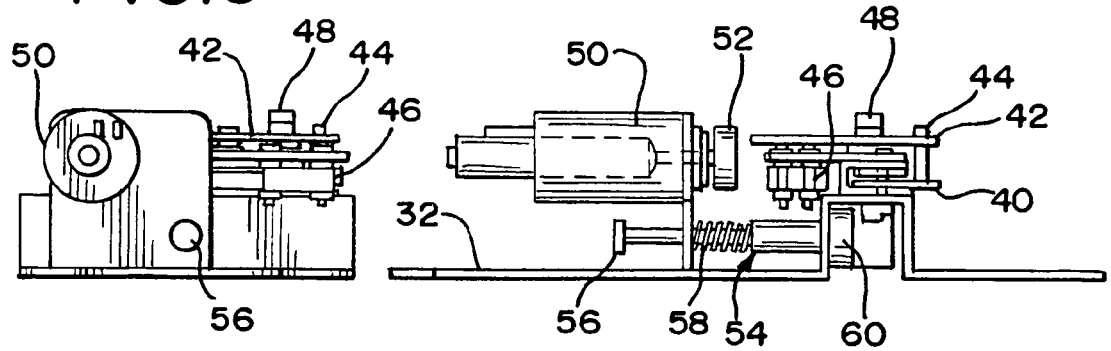

VENDING SYSTEM FOR WHEELED VEHICLES

BACKGROUND OF THE INVENTION

This invention relates to vending systems, and in particular to a vending system for multiple wheeled vehicles, such as strollers and the like.

Vending systems for wheeled vehicles are well-known. For example, a vending system for carts and the like has been used for years in airports and other locations, and U.S. Pat. Nos. 3,978,959; 4,450,968; 4,518,073 and 6,142,283 are directed to that system.

Another system for unattended vending of bicycles is set forth in U.S. Pat. No. 5,917,407. It includes a series of bays in which individual bicycles are locked, and a vending control tower for vending of individual bicycles. It also includes a particular means of holding locked bicycles in place. Another type of similar locking device is set forth in U.S. Pat. No. 6,085,887.

SUMMARY OF THE INVENTION

The invention is directed to a vending system for wheeled vehicles, comprising a vehicle station having at least one docking port. A lock and release mechanism is provided in the docking port, the lock and release mechanism having a latch. A striker pin is provided on each wheeled vehicle, with the striker pin being shaped for engaging the latch of the lock and release mechanism. A vehicle discharge element is located in the docking port for moving the wheeled vehicle upon activation of the lock and release mechanism to disengage the striker pin from the latch. This, then, moves the wheeled vehicle from its locked position.

In accordance with the preferred form of the invention, the vehicle station comprises an operator's console and plurality of the docking ports. The operator's console includes a controller connected for controlling the lock and release mechanism of each docking port. The operator's console also includes a fee receptacle and a vehicle-selection keypad.

The lock and release mechanism includes a microswitch for sensing presence of the striker pin in the latch. It also includes a solenoid connected to activate the latch. The vehicle discharge element comprises a spring-loaded ejection shaft.

The method according to the invention comprises the sequential steps of first capturing the wheeled vehicle in a locked position in the lock and release mechanism. Then, the wheeled vehicle is released from the lock and release mechanism responsive to a discharge signal, and finally the wheeled vehicle is mechanically ejected upon releasing of the wheeled vehicle to move the wheeled vehicle from the locked position.

Before releasing of the vehicle, the method preferably includes the step of accepting, in a fee-reading receptacle, a fee for release of the wheeled vehicle. The releasing step then includes releasing a desired wheeled vehicle from a plurality of captured wheeled vehicles after a selection of the desired wheel vehicle has been made. Preferably, the selection is made by entry of a code unique to the desired wheeled vehicle.

When the wheeled vehicle is mechanically ejected to move it, preferably that includes pushing the wheeled vehicle from the lock and release mechanism, making the availability of the wheeled vehicle obvious. When the wheeled vehicle is returned to one of the docking ports, the method also includes the step of generating a monetary refund when the wheeled vehicle is ultimately recaptured.

BRIEF DESCRIPTION OF THE DRAWING

The invention is described in greater detail in the following description of examples embodying the best mode of the invention, taken in conjunction with the drawing figures, in which:

FIG. 6 is a perspective view of a housing for one of the docking ports, FIG. 7 is a side elevational view of the lock and release mechanism located within the docking port of FIG. 6, FIG. 8 is a top plan view of the lock and release mechanism of FIG. 7, FIG. 9 is an end view, taken from the left end of FIG. 7, of the lock and release mechanism.

DESCRIPTION OF EXAMPLES EMBODYING THE BEST MODE OF THE INVENTION

Figure 1:
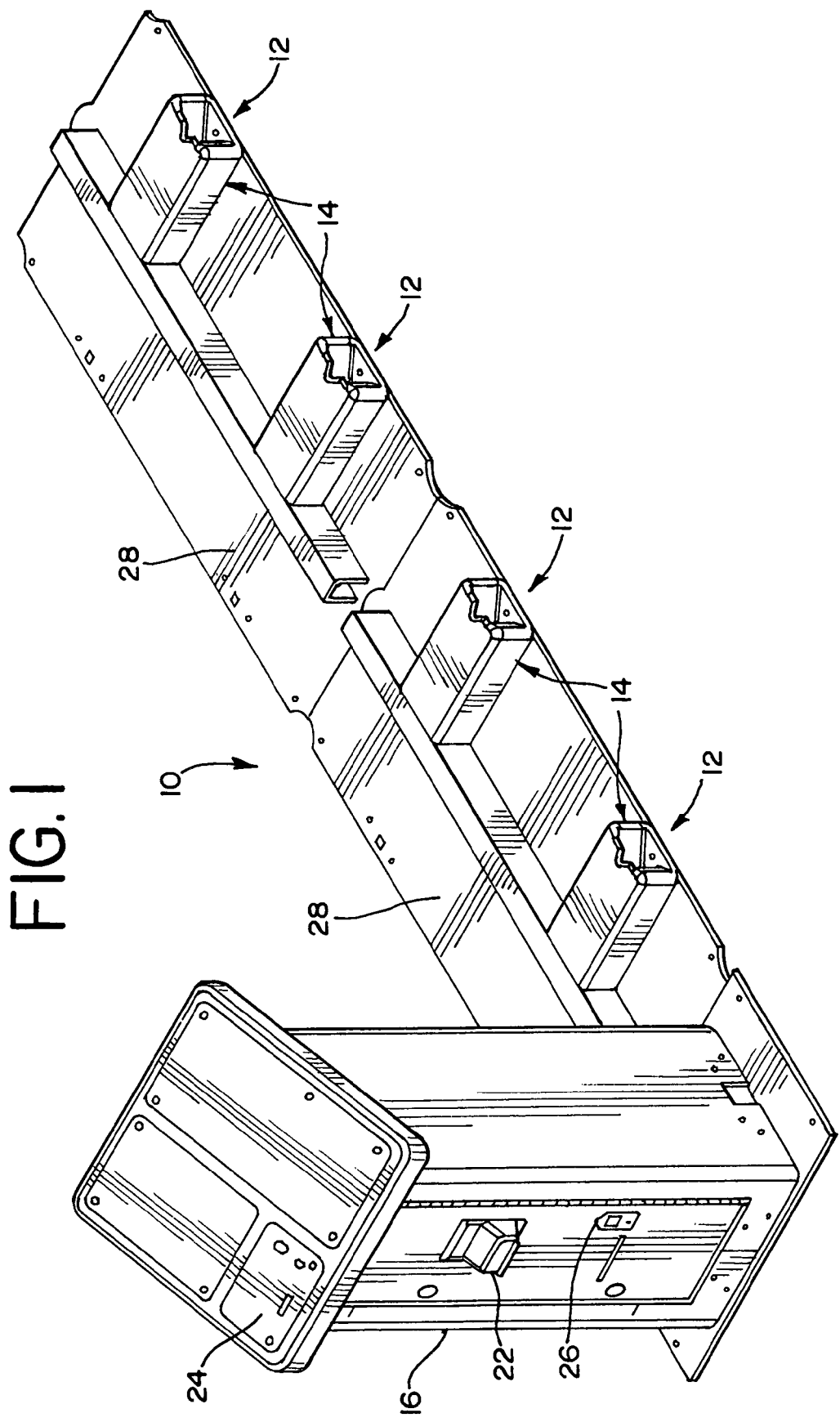
FIG. 1 is an elevated perspective view of a vending system according to the invention.

A vending system according to the invention is shown generally at 10 in the drawing figures. The vending system 10 includes a vehicle station 12 having a plurality of docking ports 14 and an operator's console 16.

Each of the docking ports 14, as shown in the various drawing figures, and perhaps as best shown in FIGS. 6 through 9, includes an outer housing 18, which may be metal, plastic or any other suitable material sufficiently durable to be used in the environment of the invention. As shown, the housing 18 includes an opening end 20 for accepting a wheeled vehicle and guiding proper orientation as the wheeled vehicle is docked, as explained in greater detail below.

Figure 2:
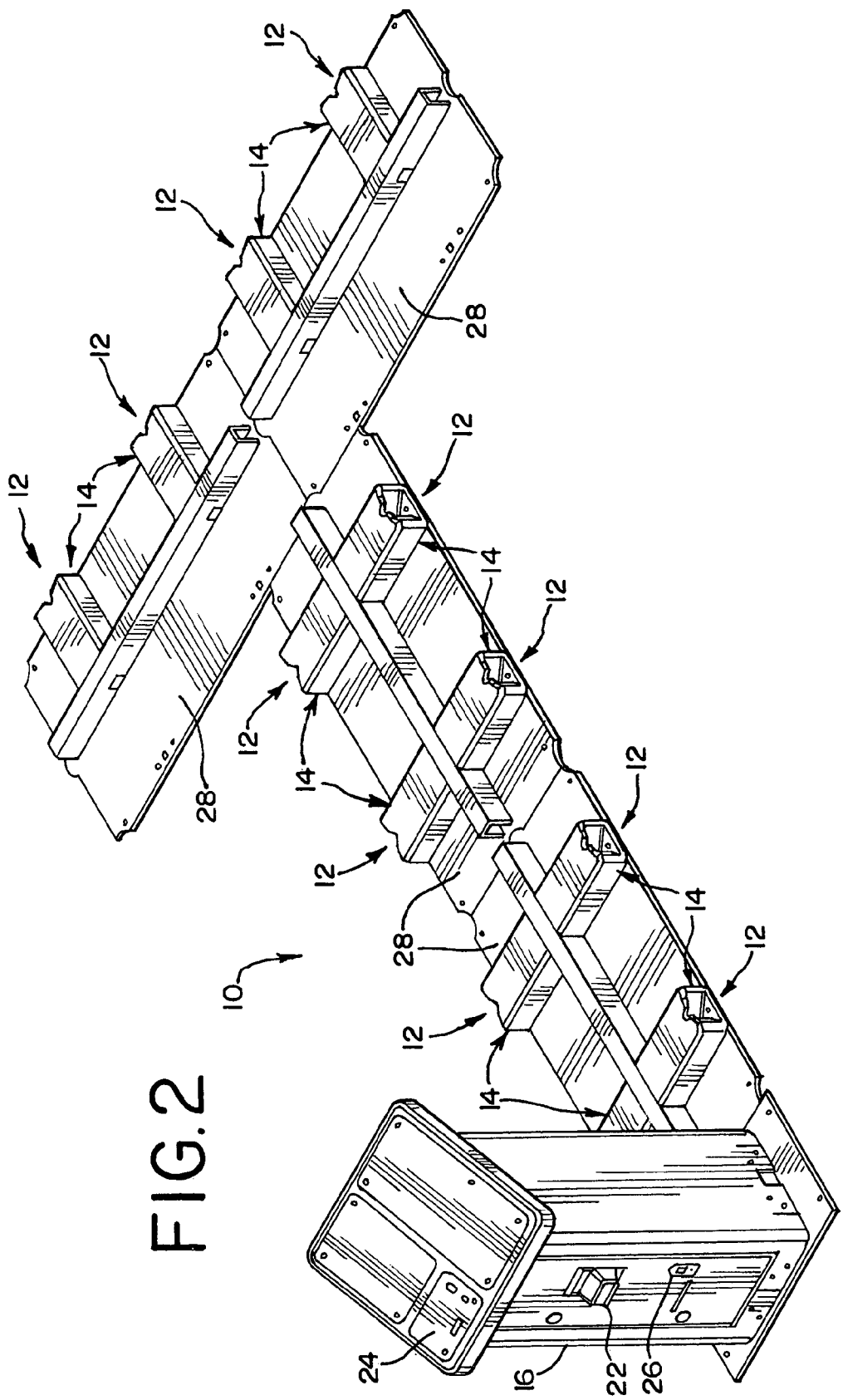
FIG. 2 is an elevated perspective view of a second configuration of a vending system according to the invention.
Figure 3:
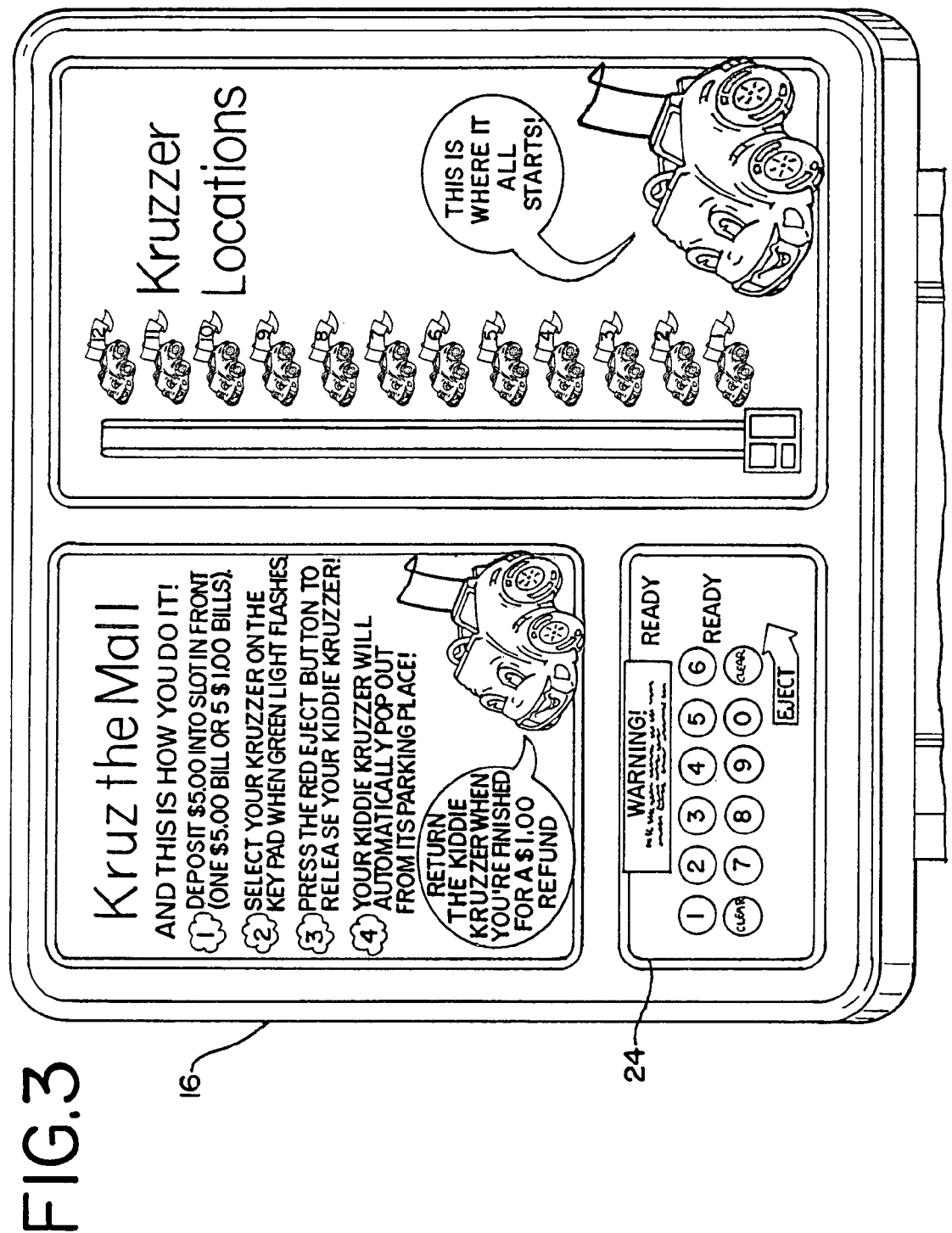
FIG. 3 is an enlarged view of the operator's panel of the operator's console according to the invention.

Two configurations of the vending system 10 are illustrated in FIGS. 1 and 2. It will be evident that many different configurations, and sizes, of the vending system are possible, depending on the number of strollers or other wheeled vehicles that will be vended at the location at which the vending system 10 is placed. Thus, what is illustrated in the drawing figures is simply illustrative.

The operator's console 16 is the operating center for the vending system 10, and includes several items. Although not illustrated in detail, within the console 16 is a central processor or controller connected for controlling each of the docking ports 14. Also, the operator's console 16 includes a fee receptacle 22 and a vehicle-selection keypad 24. The operator's console 16 may also include a coin return 26 for providing a reward to users who return strollers or other appropriate wheeled vehicles to an available docking port of the vending system 10.

The operator's console 16 is connected to each of the docking ports 14 by appropriate wiring (not illustrated), hidden beneath floor mounting plates 28 upon which the docking ports 14 are located in appropriately spaced orientations. The floor mounting plates 28, and associated wiring and docking ports, can be modular, allowing for various configurations of the vending system 10.

Figure 4:
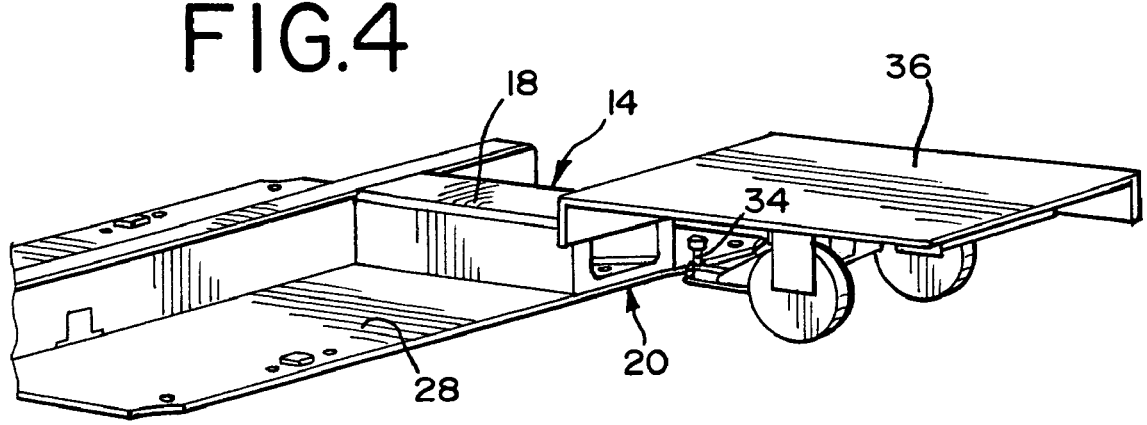
FIG. 4 is a perspective view of the docking of a wheeled vehicle in one of the docking ports according to the invention.
Figure 5:
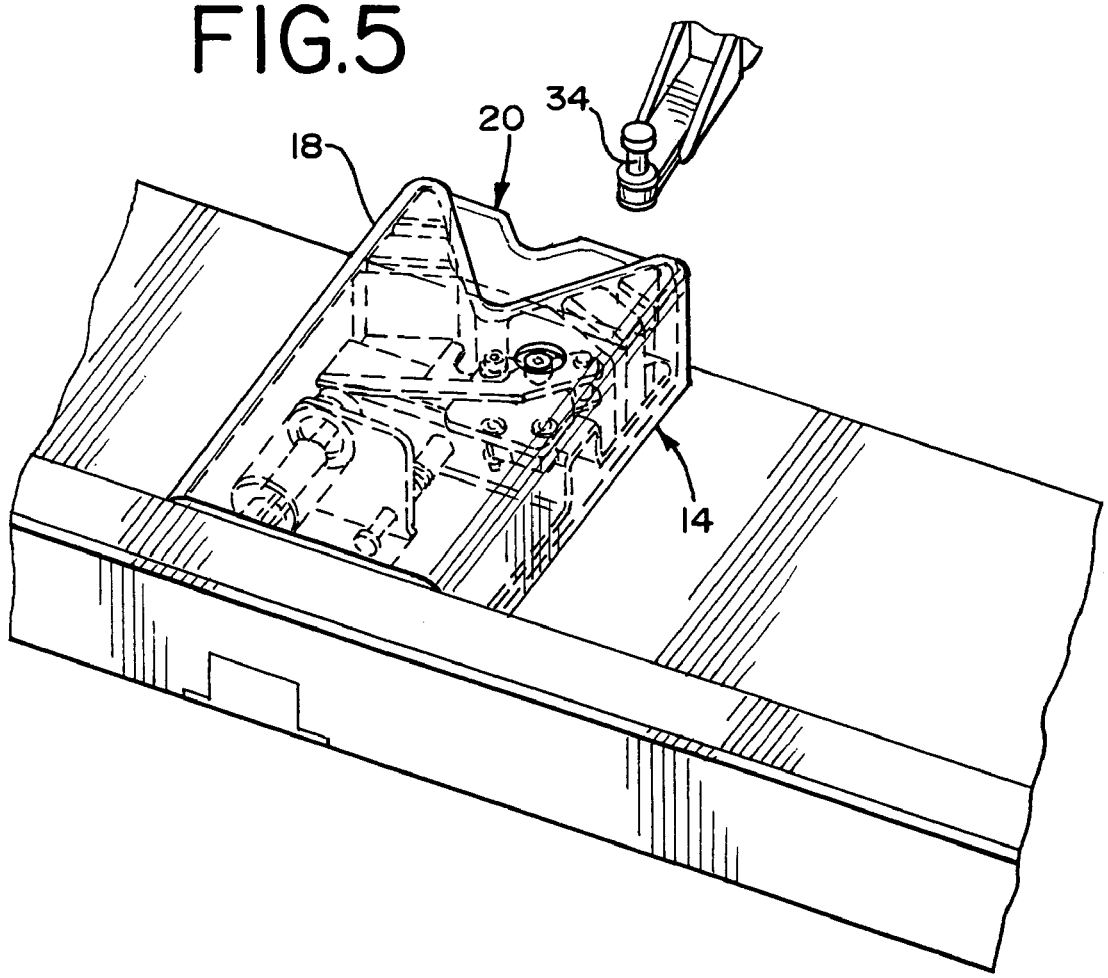
FIG. 5 is an enlarged, top perspective view of one of the docking ports according to the invention, with portions removed to show internal elements, and with a striker pin aligned therewith.
Figure 10:
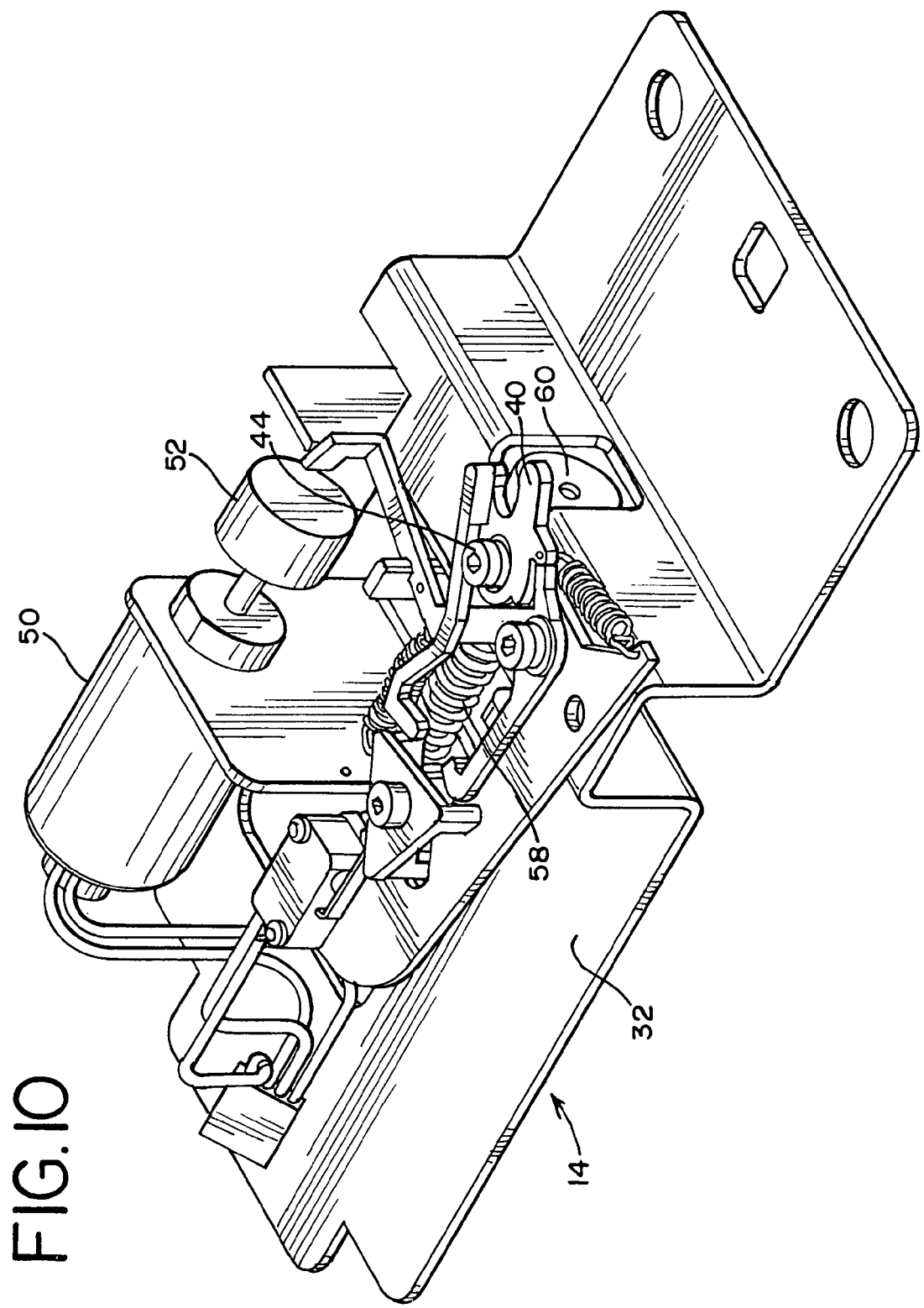
FIG. 10 is a perspective view of the mechanism of FIGS. 7-9, slightly modified but functionally identical.

As shown in FIGS. 7 through 10, each of the docking ports 14 includes a lock and release mechanism 30, mounted on a base plate 32. The lock and release mechanism 30 includes several elements which work in combination with a striker pin 34 appropriately mounted on a wheeled vehicle 36, such as a stroller or other implement, with the striker pin 34 being oriented to enter the opening end 20 of the docking port 14, as best shown in FIG. 4.

The lock and release mechanism 30 is composed of a fixed pin seat 38 and a rotatable latch 40, connected to an actuator arm 42 by means of a dowel 44. A microswitch 46 is mounted in place to sense the presence of the striker pin 34 when engaged in the rotatable latch 40. The microswitch 46 is connected to the controller in the console 16.

The actuator arm 42 is mounted on a pivot 48, and extends to the proximity of a solenoid 50, connected to the controller in the console 16. The solenoid 50 has a plunger 52 which extends, when the solenoid 50 is actuated, striking the actuator arm 42 to rotate the latch 40.

For moving the wheeled vehicle 36 when the rotatable latch 40 is rotated to release the striker pin 34, the docking port 14 also include a vehicle discharge element 54. The vehicle discharge element 54 preferably comprises a spring-loaded ejection shaft 56 with a compression spring 58. The ejection shaft 56 includes a head 60 which bears against the striker pin 34 when a wheeled vehicle 38 is locked in place in the docking port 14. While, for the sake of clarity, the striker pin is not shown in FIGS. 7 through 10, the ejector shaft 56 is shown in the ready or loaded position, and when the rotatable latch 40 is released, the ejection shaft 56 moves to the right in FIG. 7 by virtue of the force of the compression spring 58, thus forcing the striker pin out of the opening end 20 of the docking port 14, moving the wheeled vehicle 36 sufficiently to make it very evident that the vehicle has been released from its docking port.

In operation, the wheeled vehicle 38 is captured in a locked position in the lock and release mechanism 30, with the striker pin 34 locked in the rotatable latch 40. The V-shaped opening 20 guides the striker pin 34 into place when the wheeled vehicle 36 is moved into place. To release the vehicle, depending on the nature of the fee receptacle 22, a user enters an appropriate fee in the fee receptacle, such as with cash, credit card, debit card or any other fee element that represents a fee to be paid, such as smart card. Once the fee has been registered, the user can select any one the available wheeled vehicles by entering the identification of that wheeled vehicle in the vehicle-selection keypad 24. That, then, activates the solenoid 50, whose plunger 52 strikes the actuator arm 42, rotating the rotatable latch 40 to release the striker pin 34. Once the striker pin 34 has been released, the force of the compression spring 58 causes the ejection shaft 56 to move the wheeled vehicle rearwardly (in relation to the direction that it entered the docking port 14), indicating that the wheeled vehicle has been released and is available for use. The user, when finished with the wheeled vehicle 36, can return the wheeled vehicle 36 to any open docking port 14. Then, depending on the programming of the controller of the vending system 10, the user can be rewarded for returning the wheeled vehicle by means of coins ejected in the coin return 26. Other means of rewarding the user can also be implemented, such as adding a refund to a user's fee card inserted in the fee receptacle 22.

Various changes can be made to the invention with departing from the spirit thereof or scope of the following claims.

What is claimed is:

1. A vending system for wheeled vehicles, comprising
   a. a vehicle station having at least one docking port,
   b. a lock and release mechanism located in the docking port, said lock and release mechanism having a latch,
   c. a striker pin secured to a wheeled vehicle, said striker pin being shaped for engaging said latch of said lock and release mechanism to retain said striker pin and hold the wheeled vehicle in a locked position, and
   d. a vehicle discharge element in said docking port that moves the wheeled vehicle from said locked position to a released position upon activation of said lock and release mechanism to disengage said striker pin from said latch.

2. The vending system according to claim 1, in which said vehicle station comprises an operator's console and a plurality of said docking ports.

3. The vending system according to claim 2, in which said operator's console includes a controller connected for controlling said lock and release mechanism of each docking port.

4. The vending system according to claim 2, in which said operator's console includes a fee receptacle and a vehicle-selection keypad.

5. The vending system according to claim 1, in which said lock and release mechanism includes a microswitch for sensing presence of said striker pin in said latch.

6. The vending system according to claim 1, in which said lock and release mechanism includes a solenoid connected to activate said latch.

7. The vending system according to claim 1, in which said vehicle discharge element comprises a spring-loaded ejection shaft.

8. A method of vending a wheeled vehicle, comprising the sequential steps of
   a. capturing the wheeled vehicle in a locked and stationary position in a lock and release mechanism by capturing a striker pin secured to the wheeled vehicle,
   b. releasing the wheeled vehicle from the lock and release mechanism responsive to a discharge signal, and
   c. mechanically ejecting the wheeled vehicle upon the releasing of method step b to move the wheeled vehicle from the locked position to a released position.

9. The method according to claim 8, including, between method steps a and b, the step of accepting in a fee-reading receptacle a fee for release of the wheeled vehicle.

10. The method according to claim 9, in which method step b includes releasing a desired wheeled vehicle from a plurality of captured wheeled vehicles after a selection of the desired wheeled vehicle.

11. The method according to claim 9, in which the selection is made by entry of a code unique to the desired wheeled vehicle.

12. The method according to claim 8, in which method step c includes pushing the vehicle from the lock and release mechanism.

13. The method of according to claim 8, including the steps of generating a monetary refund when method step a is performed.

\* \* \* \* \*